May 22, 1923.

S. WHITE

COLLAPSIBLE STRUCTURE

Filed Nov. 20, 1922

WITNESSES

INVENTOR
Samuel White
BY
ATTORNEYS

May 22, 1923. 1,456,478
S. WHITE
COLLAPSIBLE STRUCTURE
Filed Nov. 20, 1922 2 Sheets-Sheet 2
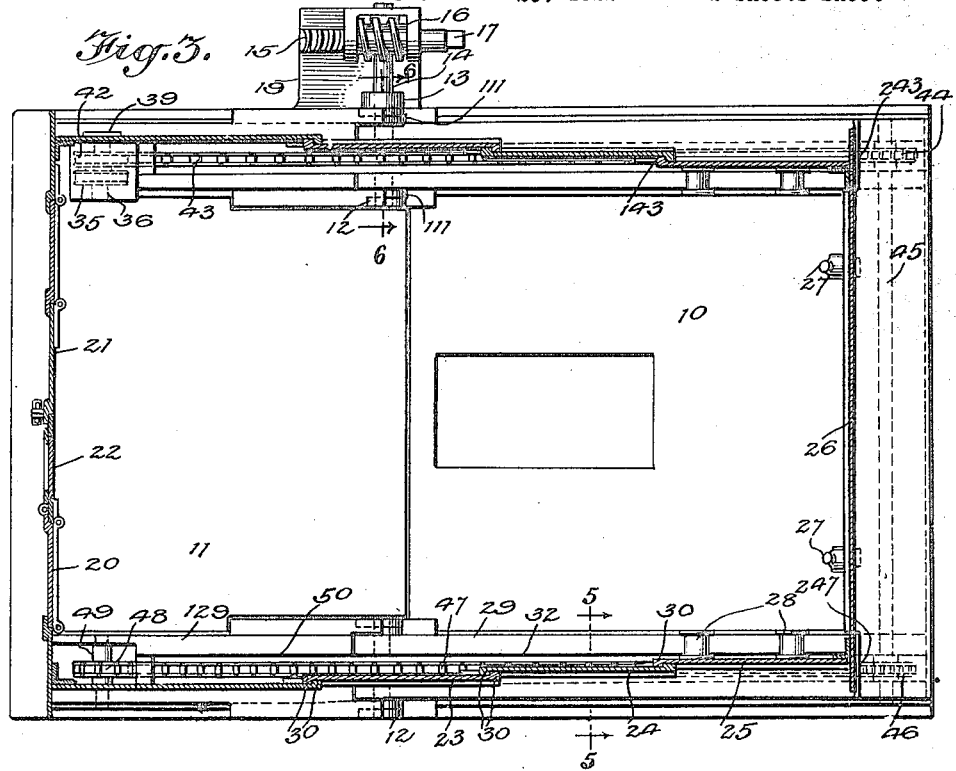
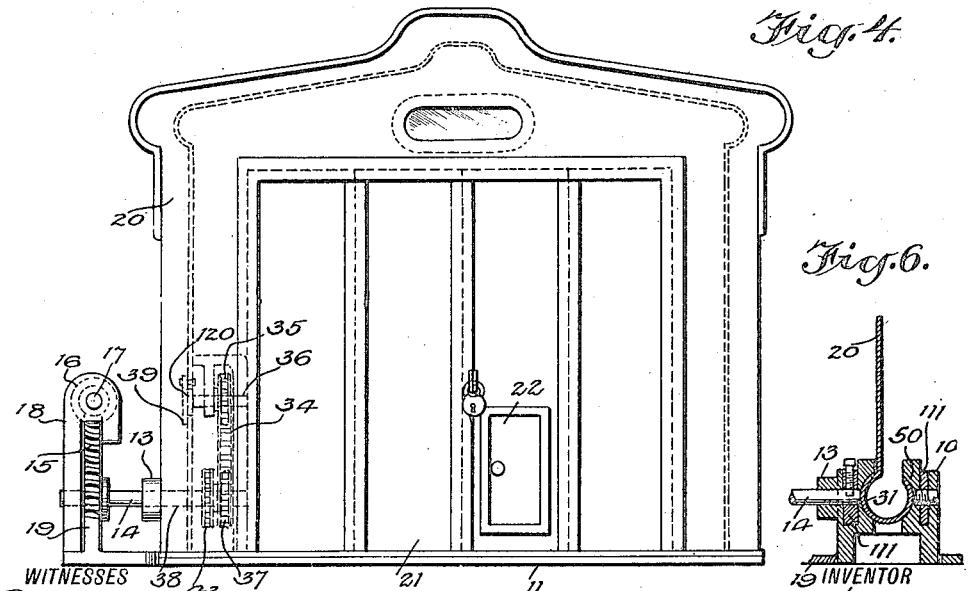
INVENTOR
Samuel White
BY
ATTORNEYS
WITNESSES Patented May 22, 1923.

1,456,478

UNITED STATES PATENT OFFICE.

SAMUEL WHITE, OF BROOKLYN, NEW YORK.

COLLAPSIBLE STRUCTURE.

Application filed November 20, 1922. Serial No. 602,310.

*To all whom it may concern:*

Be it known that I, SAMUEL WHITE, a citizen of the United States of America, and a resident of the city of New York, borough of Brooklyn, in the county of Kings and State of New York, have invented a new and Improved Collapsible Structure, of which the following is a description.

My invention is adapted for embodiment in a structure which may be used as a garage, in camping, and for various other purposes as for example a collapsible top for the body on a freight car.

The general object of my invention is to provide a novel structure of the indicated character composed of sections adapted to telescope one within another and arranged so that the telescoped sections may be turned over onto the base of the structure to thereby possess the maxium compactness.

A further object of my invention is to provide means to collapse and distend the sections and operable with convenience and facility.

The manner and means whereby the above and other objects are attained will clearly appear as the description proceeds.

Reference is to be had to the accompanying drawings forming a part of this specification, it being understood that the drawings are merely illustrative of one example of the invention.

Figure 3 is a horizontal section of the structure arranged as in Figure 1;

Figure 4 is a front elevation of the structure when erect;

Figure 1:
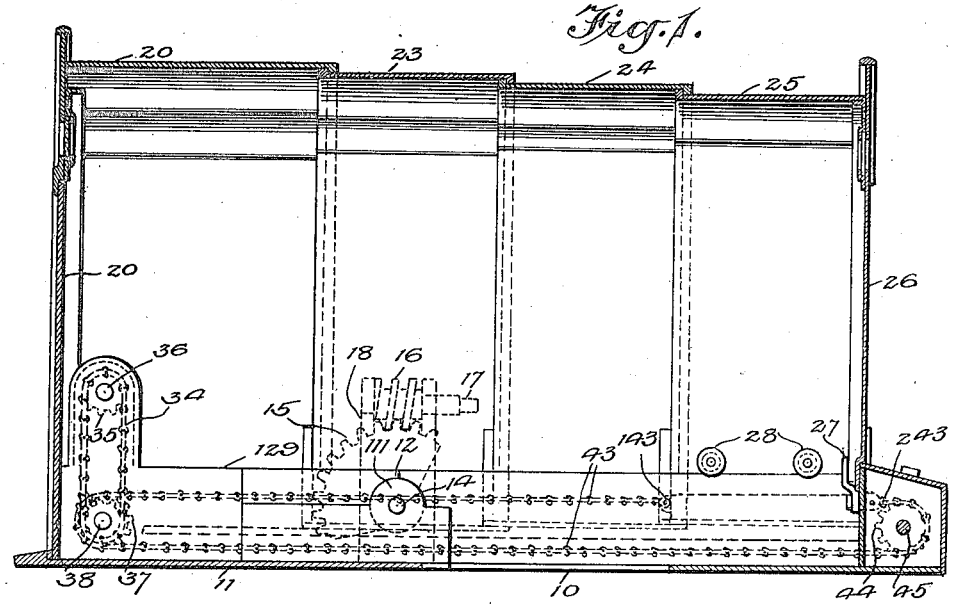
Figure 1 is a longitudinal vertical section of a collapsible structure embodying my invention showing the structure in distended form.
Figures 2, 5:
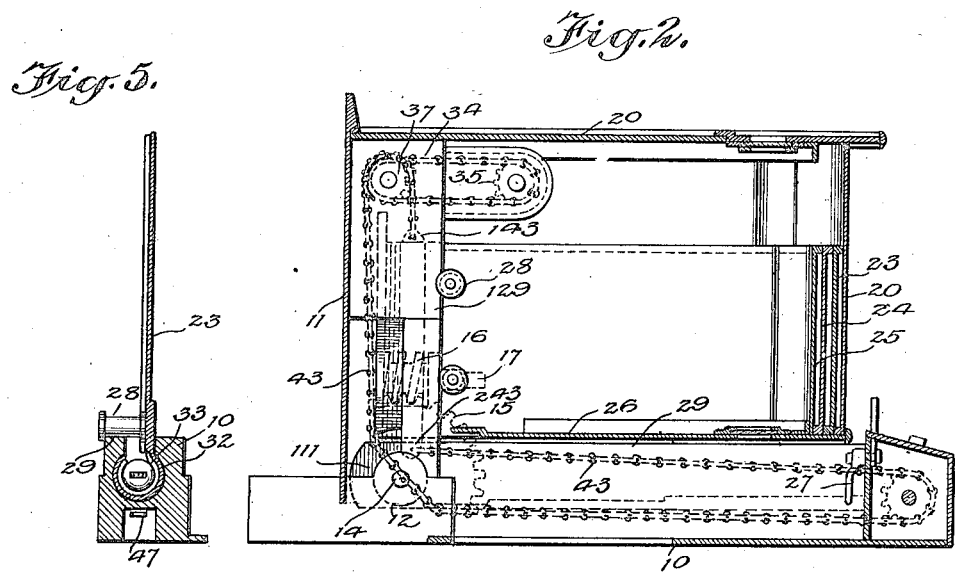
Figure 2 is a view similar to Figure 1 with the structure collapsed and folded.

Figures 5 and 6 are details in transverse vertical section as indicated by the lines 5—5 and 6—6 in Figure 3.

In carrying out my invention in accordance with the illustrated example a fixed base 10 is provided and a vertically swingable front base section 11, the two being connected by suitable side hinges, 12, here conventionally shown as of the rule-joint type.

One side of the base structure 10 at the front end has a bearing 13 turning in which is a shaft 14 extending through a fixed worm sector 15. Meshing with the fixed sector 15 is a worm 16 the shaft 17 of which is square to receive a crank handle (not shown) for turning the worm 16 and thereby causing the same to "walk" or travel over the sector 15. The worm 16 has a bearing in a yoke 18 fixed to the shaft 14 so as to turn said shaft in the bearing 13 and in the fixed standard 19 on which the sector 15 is formed, said standard 19 being rigid with the fixed base section 10. Thus, the turning of the shaft 17 and worm 16 will cause the yoke 18 and shaft 14 to turn with the axis of the shaft 14 as the center of movement. The front base section 11 has hinge members 111 suitably fastened to the shaft 14 so that the turning of the shaft will turn the base section 11 to swing the same on the hinges 12.

The super-structure is composed in part of a housing or enclosing section 20 rigid with the front base member 11 and open at its rear side. The front of the housing section 20 has a suitable door assemblage 21 including a small door 22 in one of the main doors. The super-structure includes additional housing sections 23, 24 and 25 telescoping within one another and all adapted to telescope into the front section 20, that is to say, sections 23, 24 and 25 may move from support on the main base 10 onto the swingable base section 11 and within the housing section 20. The rear telescoping section 25 has a back 26 and said section is adapted to be held in the rearward position by a swingable latch 27 swingable on a part appurtenant to the main base 10. The rear section 25 also has wheels 28 that run on track 29 on the base 10 and on a track 129 on the base section 11 when the two base sections are alined. The respective sections 23, 24, 25 have front and rear edge flanges or shoulders 30 so that one section will engage the other when the super-structure is distended.

In the front base section 11 is a longitudinal groove 50 receiving the enlarged or bent lower edge 31 of the housing section 20.

Similarly, an alining groove 32 is formed in the main base section 10 and receives the rolled lower edge portions 33 on the sections 23, 24, 25 for guiding the said sections 23 to 25 in their longitudinal movements on the base 10.

For actuating the structure sections 23, 24, 25 to move them into or out of the front section 20, the following means is made use of in the illustrated example: A drive chain 34 is disposed vertically in the housing section 20 at the front end, said chain running at the top over a sprocket wheel 35 mounted on a short transverse shaft 36 at one side of the said section 20, said chain running at its lower end over a sprocket wheel 37 on a transverse shaft 38. The shaft 36 is adapted to receive a crank handle (not shown) which is inserted in practice through a hole 120 in the section 20 alining with said shaft, said hole normally being closed by a swingable member 39. On the lower shaft 38 is a second sprocket wheel 42 over which a chain 43 runs longitudinally of the base sections 10 and 11. Said chain 43 at the rear end of base 10 in the rear of section 25 runs over a sprocket 44 on a transverse shaft 45 turning in suitable bearings provided by the base 10. The shaft 45 extends to the opposite side of the structure and has a sprocket wheel 46 thereon over which a chain 47 runs to and around a sprocket wheel 48 on a short shaft 49 at that side of the front section 20 opposite the shaft 38. The chain 43 at one end connects as at 143 with the front end of the rear super-structure section 25, the opposite end of the chain being connected to said section 25 at the back as indicated at 243. The chain 47 at the opposite side of the structure from the chain 43 connects similarly to the chain 43 with the front end of the section 25, the other end of said chain 47 connecting as at 247 with the section 25 at the back thereof. With the described drive means the turning of the shaft 36 will drive the chain 34 which will drive the sprocket 37 and shaft 38, thereby actuating the chain 43 which will turn the shaft 45 and through sprocket 46 drive the chain 47 simultaneously with the driving of the chain 43. When the chains 43, 47 have been actuated in a direction to house the sections 23, 24, 25 within the front section 20, the worm wheel 16 is turned to cause it to travel on the fixed sector 15, thereby rocking the section 20 and its base 11 rearwardly on the hinges 12 and thereby said section 20 and its base 11 with the sections 23, 24, 25 housed within the section 20 will be turned in a direction to fold the sections 20, 23, 24, 25 onto the base 10.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:—

1. A collapsible structure comprising a pivotally mounted housing section, additional sections movable into or out of the pivoted section, and means to turn said first section on its pivot with the other sections housed therein.

2. A collapsible structure including a main base section, a base section hinged to the first section to swing in a vertical plane, a super-structure on the pivoted section, and additional super-structure sections movable along the main base section into or out of the first mentioned super-structure.

3. A collapsible structure including a main base section, a base section hinged to the first section to swing in a vertical plane, a super-structure on the pivoted section, and additional super-structure sections movable along the main base section into or out of the first mentioned super-structure; together with means to lower said pivoted base section and its super-structure onto the main base section.

4. A collapsible structure including a main base section, a base section hinged to the first section to swing in a vertical plane, a super-structure on the pivoted section, and additional super-structure sections movable along the main base section into or out of the first mentioned super-structure; together with means to lower said pivoted base section and its super-structure onto the main base section; and means to actuate the super-structure sections on the main base to move them into or out of the super-structure on the pivoted base section.

5. A collapsible structure including a base, a super-structure on the base at one end, super-structure sections movable on the base to telescope said additional sections in the first mentioned super-structure.

6. A collapsible structure including a main base section, a base section pivoted on the main base section at one end to be turned into position in line with the main base section or into a vertical position, a super-structure on the pivoted base section, and telescoping super-structure sections slidably mounted on the main base section.

7. A collapsible structure including a main base section, a base section pivoted on the main base section at one end to be turned into position in line with the main base section or into a vertical position, a super-structure on the pivoted base section, and telescoping super-structure sections slidably mounted on the main base section; together with chains connected with one of the super-structure sections, and means on the pivoted base section to actuate said chains.

SAMUEL WHITE.